(12) United States Patent
Wu

(10) Patent No.: US 6,234,582 B1
(45) Date of Patent: May 22, 2001

(54) SUPPORT OF A GOLF CARTWHEEL

(75) Inventor: Fang-Li Wu, Tainan Hsien (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 0 days.

(21) Appl. No.: 09/432,209

(22) Filed: Nov. 3, 1999

(51) Int. Cl.$^7$ .......................... B60B 23/00; B60B 27/02; B60B 27/06; B60B 37/00
(52) U.S. Cl. ............................................ 301/111; 301/121
(58) Field of Search ................... 301/111 I, 112, 301/119, 121

(56) References Cited

U.S. PATENT DOCUMENTS

| | | | | |
|---|---|---|---|---|
| 602,100 | * | 4/1898 | Patterson | 301/112 |
| 4,978,175 | * | 12/1990 | Wu | 301/119 |
| 5,171,068 | * | 12/1992 | Wu | 301/111 |
| 5,507,566 | * | 4/1996 | Chen | 301/121 |
| 5,529,385 | * | 6/1996 | Tsao | 301/111 |
| 5,658,054 | * | 8/1997 | Wu | 301/119 |
| 6,003,956 | * | 12/1999 | Wu | 301/111 |
| 6,056,369 | * | 5/2000 | Lin | 301/111 |
| 6,120,106 | * | 9/2000 | Liao | 301/111 |

\* cited by examiner

*Primary Examiner*—S. Joseph Morano
*Assistant Examiner*—Jason R. Bellinger
(74) *Attorney, Agent, or Firm*—Rosenberg, Klein & Lee

(57) ABSTRACT

A support of a golf cartwheel has a holding member, an axle and a curved fastening plate. The axle has an outer end connected to the wheel, and an inner end passed into the holding member. The inner end has two square blocks each received in a respective square part of the holding member. The axle further has an intermediate rod portion between the square blocks. The curved fastening plate is resilient, and is pivoted on the holding member. The curved fastening plate has a curved protrusion and a curved portion. The curved fastening plate can be secured in a closed position where the curved protrusion engages the axle rod portion with the curved portion contacting the axle rod portion, and the fastening plate is inserted into between, and secured by the square parts of the holding member in order to prevent the axle from separating from the holding member.

2 Claims, 3 Drawing Sheets

SUPPORT OF A GOLF CARTWHEEL

BACKGROUND OF THE INVENTION

The present invention relates to a support of a golf cartwheel, which is provided on the lower part of the golf cart in order for a wheel to be fitted thereto to provide the golf cart with mobility.

Referring to FIG. 4, a heretofore known support of a golf cartwheel issued with U.S. Pat. No. 5,529,385 comprises an axle 10 and a connecting member 20.

The axle 10 has an outer end portion provided for a wheel (not shown) to be fitted thereto and an inner end portion 101. The inner end portion 101 has a cylindrical part 102, a square part 103 and an annular trench 104 between the cylindrical part 102 and the square part 103.

The connecting member 20 has a receiving hole 201, and has a fastening cover 30 pivoted thereon. The receiving hole 201 has a round hole 202 and a square hole 203. The fastening cover 30 has a stopping protrusion 301.

In combination, the axle inner end portion 101 is passed into the receiving hole 201 of the connecting member 20; the cylindrical part 102 and the square part 103 will be received in the round hole 202 and the square hole 203 respectively. The fastening cover 30 is closed on the connecting member 20 with the stopping protrusion 301 engaging the annular trench 104 in order to prevent the axle 10 from separating from the connecting member 20.

The wheel support is found to have a disadvantage; when the golf cart is moved on an uneven place and jolts, the axle 10 will separate from the connecting member 20 very easily because the fastening cover 30 cannot secure the axle 10 very well.

SUMMARY OF THE INVENTION

Therefore, it is a main object of the present invention to provide a support for a golf cartwheel which has its parts firmly connected, and cannot fall apart easily.

The support comprises:
- a holding member having two square fixing parts each having a square hole;
- an axle having a first end portion provided for the wheel to be fitted thereto, and a second end portion inserted into the holding member; the second end portion having two square blocks each received in a respective one of the square holes of the holding member;
- an intermediate rod portion being provided between the square blocks of the axle;
- a resilient curved fastening plate pivoted on the holding member, the fastening plate being capable of being pivoted to a closed position where a curved portion and a curved protrusion thereof contacts, and engages the axle intermediate rod portion respectively to secure the axle to the holding member; in the closed position, the fastening plate being further inserted into between, and fixed by the square fixing parts of the holding member to prevent the fastening plate from separating from the axle.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
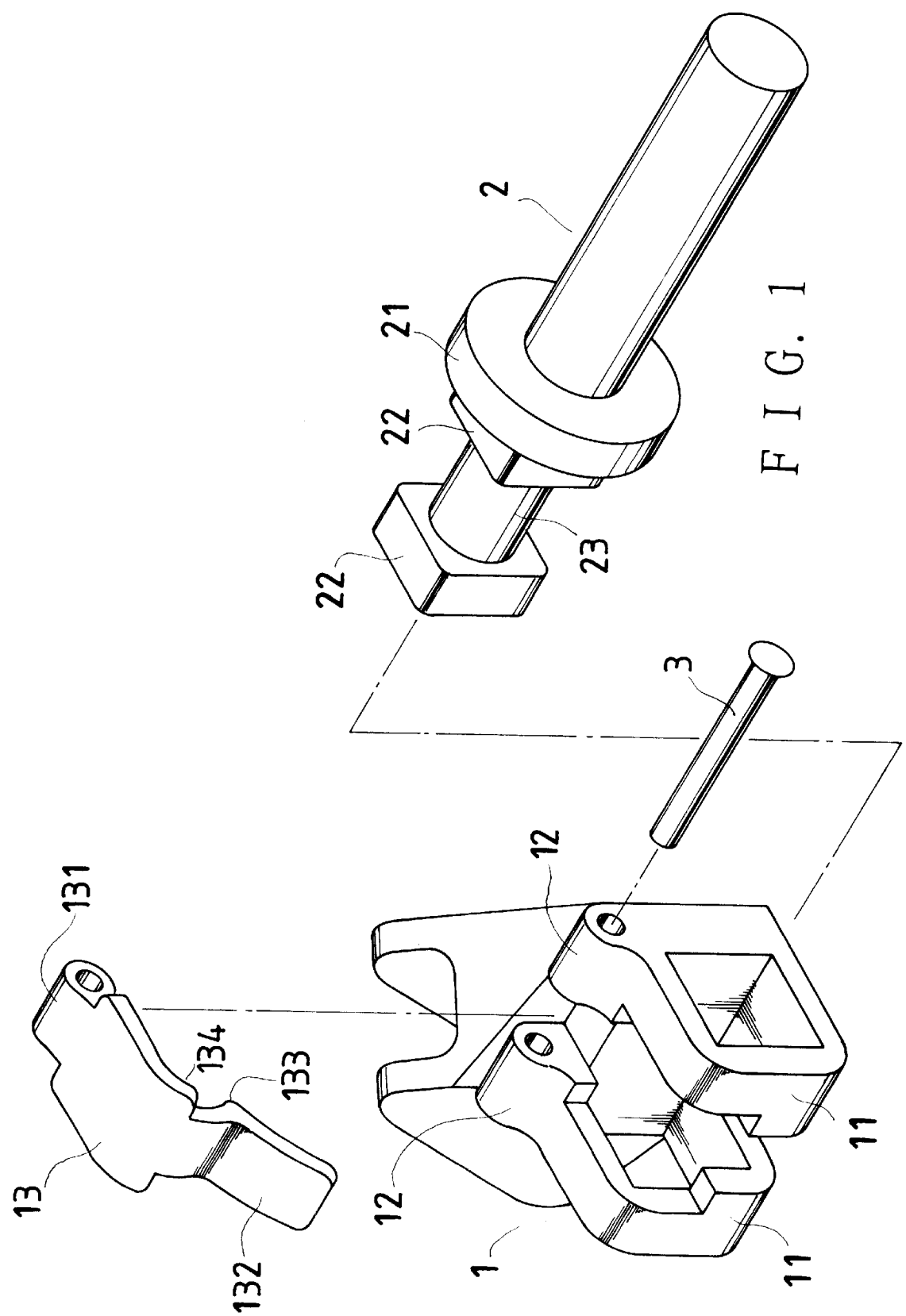
FIG. 1 is an exploded perspective view of the support of a golf cartwheel of the present invention.
Figure 2:
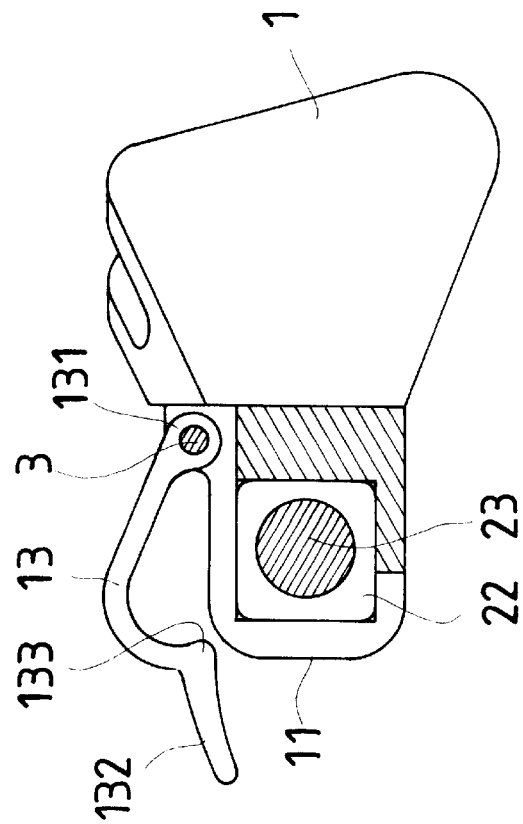
FIG. 2 is a cross-sectional view of the support of the golf cartwheel of the present invention.

Referring to FIGS. 1 and 2, a support of a golf cartwheel of the present invention comprises a holding member 1 and an axle 2.

The holding member 1 has two square fixing parts 11 opposing each other. The square fixing parts 11 each has a square hole. The holding member 1 further has a curved fastening plate 13 pivoted thereon. The curved fastening plate 13 is resilient, and has a connecting protrusion 131 connected to connecting protrusions 12 of the holding member 1 with a pin 3 passed through the connecting protrusions 131 and 12.

The curved fastening plate 13 further has a curved protrusion 133, an extended part 132 and an intermediate curved portion 134 between the connecting protrusion 131 and the curved protrusion 133. The curved fastening plate 13 can be pivoted between an open position where the plate 13 is away from the square fixing parts 11 and a closed position where the curved fastening plate 13 is inserted into between, and fixed by the square fixing parts 11.

The axle 2 has an outer end portion (not numbered) provided for a golf cart wheel (not shown) to be fitted thereto. The axle 2 further has an inner end portion including a stopping wall 21, two square blocks 22 and an intermediate rod portion 23 between the square blocks 22.

The intermediate curved portion 134 of the curved fastening plate 13 is preferrably made to have more curvature than the intermediate rod portion 23 of the axle 2 such that same 134 can contact the rod portion 23 more closely when same 134 is connected to the rod portion 23.

Figure 3:
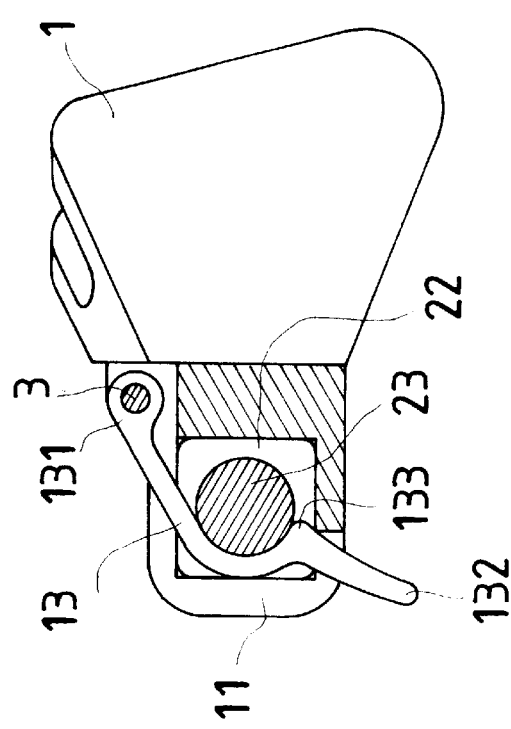
FIG. 3 is a cross-sectional view of the support of the golf cartwheel in FIG. 2, with the curved fastening plate secured in the closed position.
Figure 4:
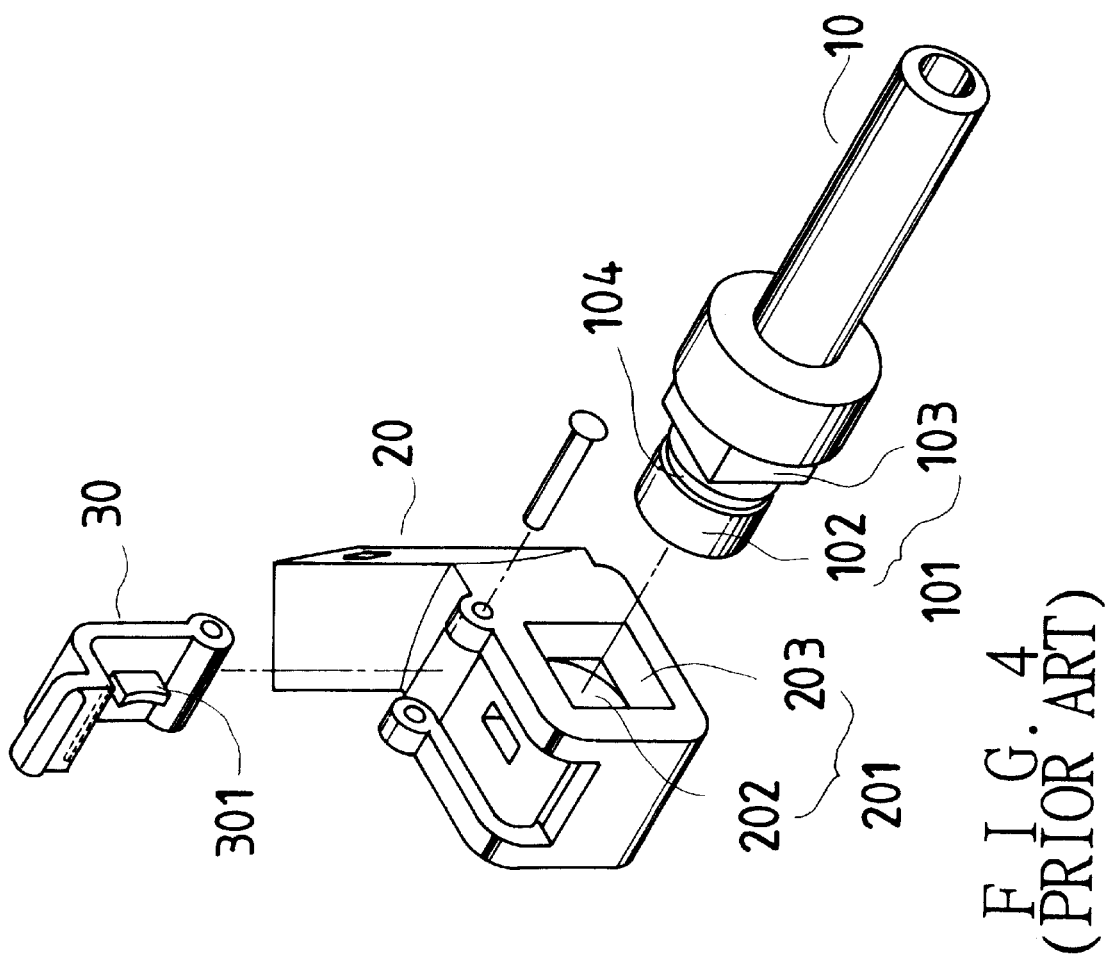
FIG. 4 is an exploded view of a prior art support of a golf cartwheel as described in the Background.

In combinatin, the inner end portion is inserted into the holding member 1 with the square blocks 22 each received in a respective one of the square holes of the square fixing parts 11. The stopping wall 21 prevents the axle 2 from being inserted further into the holding member 1, and locates the axle 2 in a proper position. Referring to FIG. 3, the curved fastening plate 13 is pivoted to the closed position by pushing the extended part 132 such that the intermediate curved portion 134 contacts the intermediate rod 23 of the axle 2 and the curved protrusion 133 closely connects the intermediate rod portion 23 to prevent the curved fastening plate 13 from separating from the axle 2. Furthermore, the curved fastening plate 13 is also fixed by the square fixing parts 11 of the holding member 1. Thus, the axle 2 can be secured to the holding member 1.

From the above description, the golf cartwheel support of the present invention can be known to have advantages as follows.

1. The resilient curved fastening plate 13 can be connected to the rod portion 23 of the axle 2 relatively firmly because the intermediate curved portion 134 thereof has more carvature than the rod portion 23.
2. The curved fastening plate 13 is secured to the holding member 1 by means of inserting same into between the square fixing parts 11 of the holding member 1 further increasing the strength of the whole wheel support.

So, the wheel support cannot fall apart even when the golf cart is moved on an uneven place.

What is claimed is:

1. A support of a golf cartwheel comprising
   (a) a holding member having two square fixing parts opposing each other, said square fixing parts each having a square hole;
   (b) an axle having a first end portion provided for a wheel to be fitted thereto and a second end portion; said second end portion having a stopping wall, two square blocks and an intermediate rod portion between said two square blocks;
   said second end portion being passed into said holding member with said square blocks thereof each received in a respective one of said square holes; said stopping wall having a larger periphery than said square holes of said holding member;
   (c) a resilient curved fastening plate pivoted on said holding member from a connecting protrusion thereof; said fastening plate having a curved protrusion and an intermediate curved portion between said connecting protrusion and said curved protrusion;
   said fastening plate being capable of being pivoted between an open position where said fastening plate is positioned away from and does not contact said square fixing parts and a closed position where said fastening plate is positioned between, and secured by said square fixing parts; said curved protrusion of said fastening plate engaging said axle intermediate rod portion and said intermediate curved portion of said fastening plate contacting said axle intermediate rod portion when said fastening plate is positioned in said closed position.

2. The support of a golf cartwheel as claimed in claim 1, wherein said intermediate curved portion of said fastening plate has a curvature at least more than a curvature of said axle intermediate rod portion.

* * * * *